B. L. SPITZER.
COMBINED RADIOGRAPH MOUNT AND CONTAINER.
APPLICATION FILED MAY 31, 1917.

1,274,804.

Patented Aug. 6, 1918.

Inventor
Benjamin L. Spitzer
By his Attorneys
Mock & Blum

UNITED STATES PATENT OFFICE.

BENJAMIN L. SPITZER, OF NEW YORK, N. Y.

COMBINED RADIOGRAPH MOUNT AND CONTAINER.

1,274,804.  Specification of Letters Patent.  Patented Aug. 6, 1918.

Application filed May 31, 1917. Serial No. 172,126.

*To all whom it may concern:*

Be it known that I, BENJAMIN L. SPITZER, a citizen of the United States, residing at New York, in the county of New York and State of New York, have invented certain new and useful Improvements in Combined Radiograph Mounts and Containers, of which the following is a specification.

This invention relates to a combined radiograph mount and container used for holding, filing and displaying radiographs and similar photographic impressions which are printed on celluloid, gelatin or analogous material.

In taking X-ray photographs or radiographs, especially radiographs of dental processes, the radiograph so obtained usually appears on translucent mounts such as celluloid with a mat finish. However, a transparent or clear celluloid could also be used, in order to view the radiograph by transmitted light. It is desirable to have the border of the radiograph surrounded by material unpermeable to light, so as to secure clearer definition of its details, when viewed by transmitted light.

To show or mount a film of this character most acceptably, I have devised a suitable combination of the mount for the radiograph and a container for said mount which will serve as a file record and will also provide the best optical conditions for viewing and reading the radiographic impression. The following sets forth a preferred embodiment of my invention.

In the drawings Figure 1 shows a front elevation of the film mount with a specimen film positioned therein.

Figure 1:
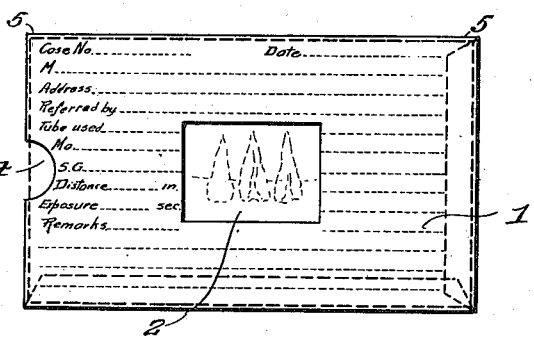
Figure 2:
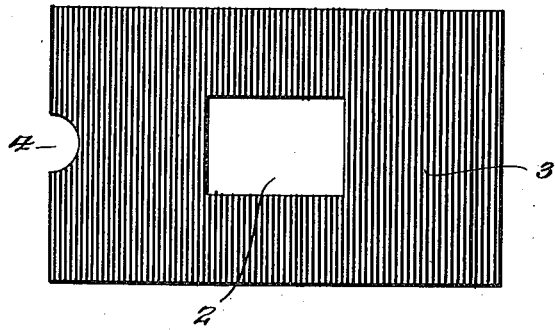
Fig. 2 shows a rear view thereof, the radiograph being omitted.
Figure 3:
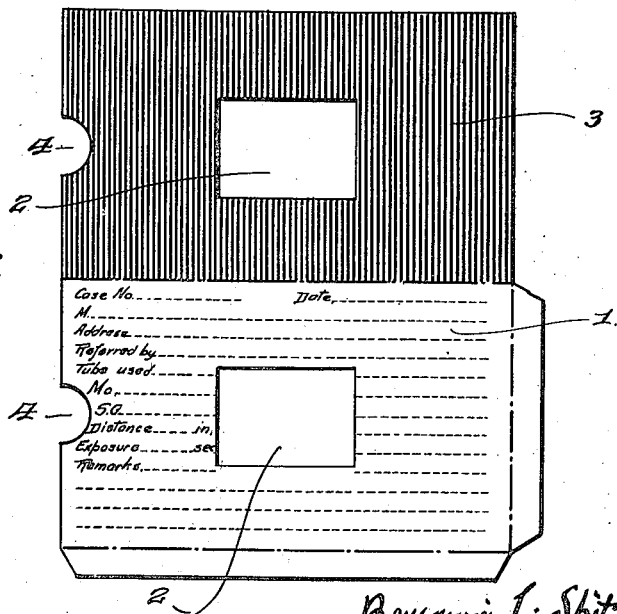
Fig. 3 shows an outline of the blank from which the film container or envelop is formed.

The body 1 comprising the front of the envelop is of a rectangular shape having the opening therein 2 through which the film is viewed, may be made of any suitable quality of paper. On the face of the body 1 are printed the reference items which it is desirable to note in connection with these radiographs, such as name of physician, name of patient, date, description of material photographed, name of operator, etc., which are printed on the face 1 with room for appropriate accompanying memoranda to be written opposite each of these items.

The rear member of the envelop or container 3 has a similar opening cut therein denominated 2′ but all of the surface of said rear member 3 is printed with an opaque color such as black so that no light can reach the front of the envelop from the rear except through the opening 2. This can be done by printing the lines shown in the drawing, sufficiently close together, so that substantially no light can pass through the rear. For convenience in handling the radiograph mount inserted in the envelop the edge of the same is indented as at 4 to permit the exposure of a small portion of the surface of the radiograph mount. The radiograph mount of celluloid or the like is of the exact dimensions of the envelop and the radiograph is mounted thereon, so as to register with the openings 2 and 2′ when the mount is inserted into the envelop.

For convenience in manufacturing I cut the envelop from a single blank folded along the line 5—5 and the printed notations on the front may be printed simultaneously with the printing required to make the rear member impermeable to light when the envelop is manufactured from ordinary white paper stock.

It will thus be seen that I have contrived to combine a simple, compact and convenient combination of the container and a radiograph mount of this character, the front surface of the container serving as a permanent record of the matter shown in the film itself, while it also serves to furnish the most favorable optical conditions for viewing the radiograph without removing the mount from the container. This container is of suitable size for a filing cabinet or like system of recording so that the user can both view the radiograph under favorable conditions, and also see all the data appertaining thereto. A 3″x5″ envelop is of convenient size for this purpose.

It is obvious that changes might be made in the details of my invention without departing from its spirit as defined in the claims.

What I claim is:—

1. In combination, a radiograph mount and container, said container having a rear member having an aperture therein, and also having a corresponding front member having an aperture registering with said first-mentioned aperture, said mount having a radiograph fastened thereto in such a position that said radiograph registers with said aperture when two of the edges of said mount touch two corresponding edges of the said container, the rear surface of said rear member and the front surface of said front member being printed with an opaque ink so that the said rear member is rendered substantially opaque, and notations indicative of the data appertaining to said film being printed upon the front surface of said front member.

2. A container for radiograph mounts and the like, consisting of a blank of white paper adapted to be folded along a definite line so as to form a rear member and a front member, said blank having two corresponding apertures so placed that they register when said blank is folded along said line, one side of said blank being printed with an opaque ink so that one of said members is rendered substantially impermeable to light, and the other of said members having notations indicative of the data appertaining to said radiograph printed thereon, said blank being so folded that the said substantially impermeable surface becomes the rear surface of the rear member, and the said notations appear on the front surface of said front member, whereby both faces of said blank can be simultaneously printed.

In testimony whereof I hereunto affix my signature.

BENJAMIN L. SPITZER.